(No Model.)
H. HOSEUS.
TAMBOURINE.
No. 356,767. Patented Feb. 1, 1887.
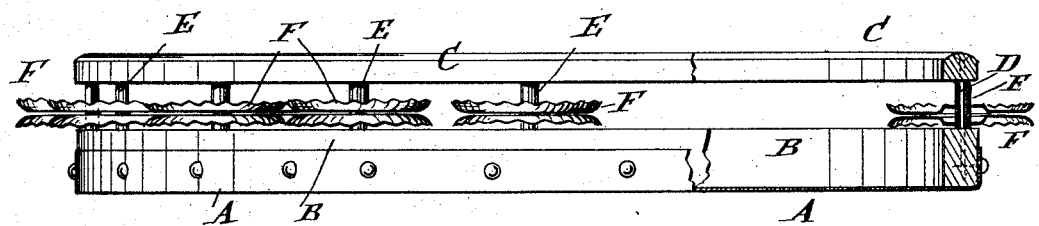
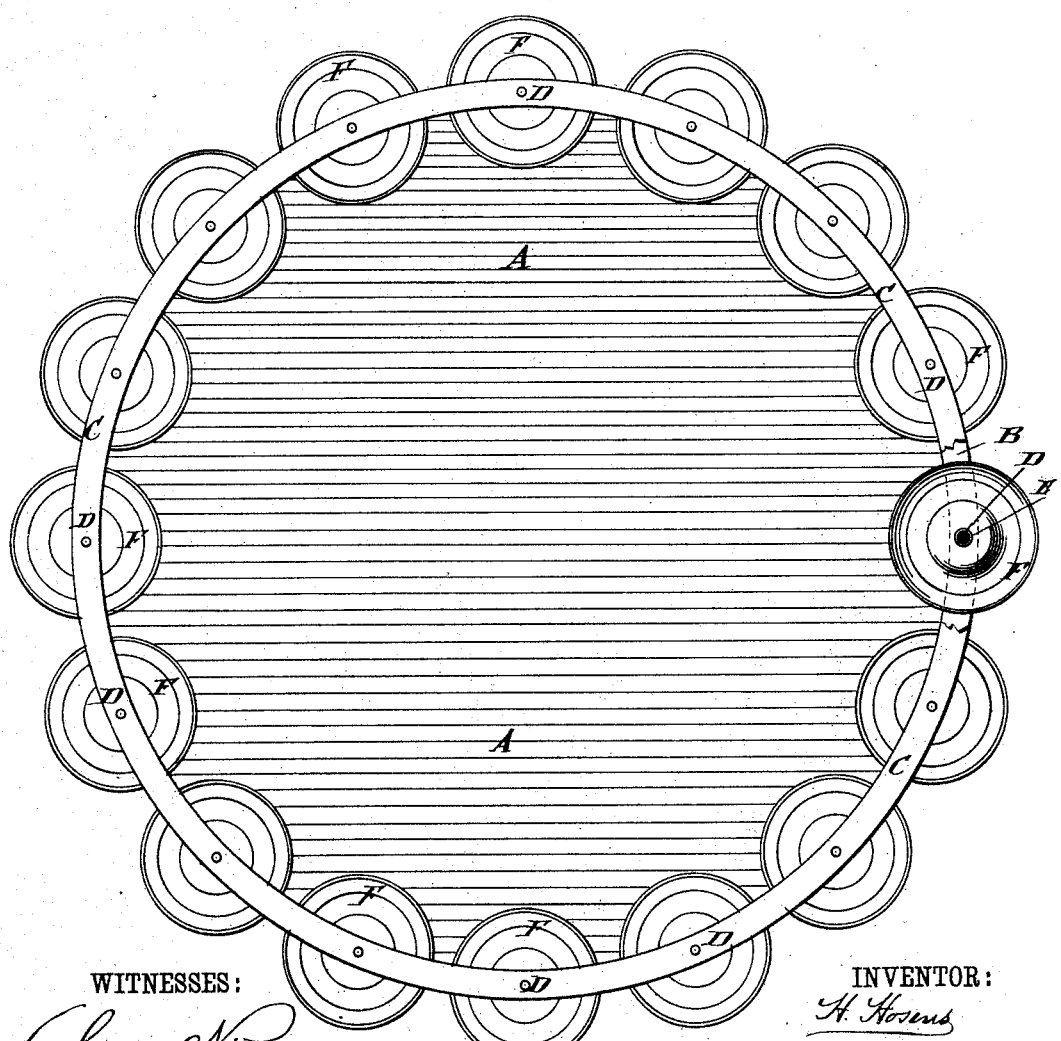
WITNESSES:
Chas. N---
C. Sedgwick
INVENTOR:
H. Hoseus
BY Munn & Co.
ATTORNEYS.

UNITED STATES PATENT OFFICE.

HENRY HOSEUS, OF BROOKLYN, NEW YORK.

TAMBOURINE.

SPECIFICATION forming part of Letters Patent No. 356,767, dated February 1, 1887.

Application filed June 1, 1886. Serial No. 203,847. (No model.)

*To all whom it may concern:*

Be it known that I, HENRY HOSEUS, of the city of Brooklyn, in the county of Kings and State of New York, have invented a new and useful Improvement in Tambourines, of which the following is a full, clear, and exact description.

Reference is to be had to the accompanying drawings, forming a part of this specification, in which similar letters of reference indicate corresponding parts in both the figures.

Figure 1 is a side elevation, partly in section, of my improved tambourine. Fig. 2 is a plan view of the same, part being broken away.

The object of this invention is to provide tambourines constructed in such a manner that many more jingles can be used upon them than is possible when the tambourines are constructed in the ordinary manner.

The invention consists in the combination, with the rim, the head, and the jingles and their pins, of a second rim and spacing tubular washers, as will be hereinafter fully described.

A represents the head or skin, which is secured to the rim B in the ordinary manner.

C is a second rim, which is secured to the rim B by the pins D, passing through the rim C and into the rim B. The rim C is kept at the proper distance from the rim B by tubular washers E, placed upon the pins D, between the said rims B C, as shown in Fig. 1.

F are the ordinary jingles, which are placed upon the pins D and washers E, and between the rims B C, as shown in Figs. 1 and 2.

By this construction a great many more jingles can be used than is possible when the jingles are placed in openings in the rim in the ordinary manner.

The tubular washers may be omitted and the rims otherwise spaced.

Having thus described my invention, what I claim as new, and desire to secure by Letters Patent, is—

1. In a tambourine, the combination, with the head-carrying rim and an auxiliary rim held to the main rim by jingle-carrying pins, of spacing-washers upon said pins, substantially as shown and described.

2. As an improved article of manufacture, a tambourine having a divided or two-part rim, substantially as shown and described.

3. As an improved article of manufacture, a tambourine having a divided or two-part rim, the parts being held together and spaced by jingle-carrying pins, substantially as shown and described.

4. In a tambourine, the combination, with the head A, the rim B, and the jingles F and their pivoting-pins D, of the rim C, secured to the said rim B by the said pins D, substantially as herein shown and described, whereby the number of jingles used can be greatly increased, as set forth.

5. In a tambourine, the combination, with the head A, the rim B, the jingles F, and their pivoting-pins D, and the rim C, secured to the said rim B by the said pins D, of the tubular washers E, placed upon the said pins between the said rims, substantially as herein shown and described, whereby the said rims are kept at the desired distance apart, as set forth.

HENRY HOSEUS.

Witnesses:
 JAMES T. GRAHAM,
 EDGAR TATE.